(12) United States Patent
Smart et al.

(10) Patent No.: US 11,186,808 B2
(45) Date of Patent: Nov. 30, 2021

(54) INFUSER FOR ALCOHOLIC BEVERAGES

(71) Applicant: SMART SPIRITS, S.L., Valencia (ES)

(72) Inventors: Mark Francis Joseph Smart, Valencia (ES); Carlos Sanchez Llopis, Valencia (ES); Carlos Sanchez Bou, Valencia (ES)

(73) Assignee: SMART SPIRITS, S.L., Valencia (ES)

( * ) Notice: Subject to any disclaimer, the term of this patent is extended or adjusted under 35 U.S.C. 154(b) by 537 days.

(21) Appl. No.: 15/549,632

(22) PCT Filed: Feb. 16, 2016

(86) PCT No.: PCT/ES2016/070090
§ 371 (c)(1),
(2) Date: Aug. 8, 2017

(87) PCT Pub. No.: WO2016/132005
PCT Pub. Date: Aug. 25, 2016

(65) Prior Publication Data
US 2018/0044621 A1 Feb. 15, 2018

(30) Foreign Application Priority Data
Feb. 16, 2015 (ES) .............................. ES201530209

(51) Int. Cl.
C12G 3/06 (2006.01)
A47J 31/00 (2006.01)

(52) U.S. Cl.
CPC ............... C12G 3/06 (2013.01); A47J 31/00 (2013.01)

(58) Field of Classification Search
CPC .................................. A47J 31/00; C12G 3/06
(Continued)

(56) References Cited

U.S. PATENT DOCUMENTS 2,027,129 A * 1/1936 Thomas ................... C12H 1/00
426/313
2,335,065 A * 11/1943 Kedrovich ................ C12J 1/10
99/323.12

(Continued)

FOREIGN PATENT DOCUMENTS

DE 202009002739 3/2010
DE 102012101157 8/2012
(Continued)

OTHER PUBLICATIONS

International Search Report for PCT/ES2016/070090, English Translation attached to original, Both completed by the European Patent Office on Jun. 10, 2016, 7 Pages.

Primary Examiner — Eric S Stapleton
(74) Attorney, Agent, or Firm — Brooks Kushman P.C.

(57) ABSTRACT

An infuser for alcoholic beverages, having a container of ethyl alcohol and a water source, both of which are hydraulically connected to a volumetric mixing chamber, a water capsule holder located downstream of the volumetric chamber and intended to receive capsules containing single doses of essences, and extracting liquid from the volumetric chamber and injecting same into a capsule. The ethyl alcohol container and the water source are connected to the volumetric chamber by shut-off solenoid valves, and the volumetric chamber contains a main electrode and a plurality of secondary electrodes disposed above the main electrode at different levels.

7 Claims, 3 Drawing Sheets

(58) Field of Classification Search
USPC .......................................................... 99/279
See application file for complete search history.

(56) References Cited

U.S. PATENT DOCUMENTS

| | | | | |
|---|---|---|---|---|
| 2,390,717 | A * | 12/1945 | Knebel | C12J 1/00 99/323.12 |
| 3,446,937 | A * | 5/1969 | Hugentobler | A47J 31/545 392/490 |
| 3,788,302 | A * | 1/1974 | Malaney | A47J 27/18 126/374.1 |
| 4,073,955 | A * | 2/1978 | Koppelman | B01F 7/00016 426/422 |
| 4,187,262 | A * | 2/1980 | Fessler | B01F 3/04808 137/409 |
| 4,323,004 | A * | 4/1982 | Sereda | B01F 3/088 137/93 |
| 4,397,814 | A * | 8/1983 | Darecchio | A23L 3/001 422/111 |
| 4,643,083 | A * | 2/1987 | Boucher | C12H 6/02 99/275 |
| 4,688,550 | A * | 8/1987 | Lopes | C10L 1/328 126/378.1 |
| 4,702,611 | A * | 10/1987 | Crossley | A23G 9/045 366/325.1 |
| 4,773,315 | A * | 9/1988 | Enenkel | C12J 1/10 99/277 |
| 4,957,765 | A * | 9/1990 | Widmar | A23C 13/14 426/250 |
| 5,858,437 | A * | 1/1999 | Anson | A47J 31/002 426/431 |
| 6,164,189 | A * | 12/2000 | Anson | A47J 31/56 99/281 |
| 6,182,555 | B1 * | 2/2001 | Scheer | A47J 31/40 222/129.1 |
| 6,460,735 | B1 * | 10/2002 | Greenwald | A47J 31/467 222/145.5 |
| 6,501,058 | B2 * | 12/2002 | Jung | H05B 6/688 219/703 |
| 6,558,620 | B1 * | 5/2003 | Sanford | A61B 1/123 134/102.2 |
| 6,585,943 | B1 * | 7/2003 | Sanford | A61B 1/123 134/200 |
| 6,698,228 | B2 * | 3/2004 | Kateman | A23G 9/045 62/346 |
| 6,828,533 | B2 * | 12/2004 | Hayami | H05B 6/6494 219/730 |
| 6,845,704 | B2 * | 1/2005 | Lassota | A47J 31/402 99/280 |
| 7,087,873 | B2 * | 8/2006 | Hayakawa | F24C 15/327 126/21 A |
| 7,213,506 | B2 * | 5/2007 | Halliday | A47J 31/4407 426/115 |
| 7,316,178 | B2 * | 1/2008 | Halliday | A47J 31/0673 99/295 |
| 7,322,277 | B2 * | 1/2008 | Halliday | A47J 31/4407 426/112 |
| 7,401,545 | B2 * | 7/2008 | Hu | A47J 31/002 99/280 |
| 7,533,604 | B2 * | 5/2009 | Halliday | A47J 31/4407 426/77 |
| 7,607,385 | B2 * | 10/2009 | Halliday | A47J 31/56 99/280 |
| 7,654,191 | B2 * | 2/2010 | Greenwald | A47J 31/465 222/129.1 |
| 7,798,373 | B1 * | 9/2010 | Wroblewski | B05B 11/00 222/209 |
| 7,918,156 | B2 * | 4/2011 | Greenwald | A47J 31/56 222/129.1 |
| 8,007,847 | B2 * | 8/2011 | Biderman | A47J 31/52 426/231 |
| 8,061,263 | B1 * | 11/2011 | Hannah | A47J 31/4403 116/107 |
| 8,083,104 | B2 * | 12/2011 | Roetker | B67D 1/0858 222/1 |
| 8,220,663 | B2 * | 7/2012 | Phillips | A47J 31/46 222/136 |
| 8,309,030 | B2 * | 11/2012 | Rinker | A23L 2/52 210/203 |
| 8,337,635 | B2 * | 12/2012 | Boussemart | A47J 31/60 134/166 C |
| 8,511,221 | B2 * | 8/2013 | Sala | A47J 31/401 126/369 |
| 8,528,463 | B2 * | 9/2013 | Hallberg | B01D 3/002 99/275 |
| 8,585,827 | B2 * | 11/2013 | Boussemart | A47J 31/60 134/18 |
| 8,887,622 | B2 * | 11/2014 | Bentley | A47J 31/44 99/290 |
| 2001/0048958 | A1 * | 12/2001 | Funk | A47J 31/402 426/231 |
| 2002/0001537 | A1 * | 1/2002 | Hlebovy | A61B 1/00057 422/28 |
| 2002/0152895 | A1 * | 10/2002 | Duffy | A47J 31/0642 99/279 |
| 2002/0178932 | A1 * | 12/2002 | Cai | A47J 31/54 99/516 |
| 2003/0066431 | A1 * | 4/2003 | Fanzutti | A47J 31/545 99/279 |
| 2003/0106433 | A1 * | 6/2003 | Oldani | A47J 31/44 99/279 |
| 2003/0145734 | A1 * | 8/2003 | Ervin | A23G 9/045 99/275 |
| 2004/0025701 | A1 * | 2/2004 | Colston | A47J 31/3628 99/279 |
| 2004/0118291 | A1 * | 6/2004 | Carhuff | A47J 31/46 99/275 |
| 2004/0173102 | A1 * | 9/2004 | Halliday | A47J 31/4407 99/295 |
| 2004/0177764 | A1 * | 9/2004 | Halliday | A47J 31/4407 99/295 |
| 2004/0177765 | A1 * | 9/2004 | Halliday | B65D 85/8043 99/295 |
| 2004/0182250 | A1 * | 9/2004 | Halliday | A47J 31/4407 99/279 |
| 2004/0182251 | A1 * | 9/2004 | Halliday | A47J 31/4407 99/279 |
| 2004/0187695 | A1 * | 9/2004 | Halliday | A47J 31/4407 99/295 |
| 2004/0187696 | A1 * | 9/2004 | Halliday | A47J 31/4407 99/295 |
| 2004/0206245 | A1 * | 10/2004 | Halliday | A47J 31/0673 99/337 |
| 2004/0211322 | A1 * | 10/2004 | Halliday | A47J 31/0673 99/279 |
| 2004/0253360 | A1 * | 12/2004 | Squicciarini | A61K 9/0056 426/592 |
| 2004/0255790 | A1 * | 12/2004 | Green | A47J 31/3633 99/279 |
| 2005/0034604 | A1 * | 2/2005 | Halliday | A47J 31/0673 99/279 |
| 2005/0103204 | A1 * | 5/2005 | Halliday | A47J 31/446 99/295 |
| 2006/0027103 | A1 * | 2/2006 | Boussemart | F24H 1/121 99/323.3 |
| 2006/0070979 | A1 * | 4/2006 | Christenson | C11D 7/02 216/83 |
| 2006/0196363 | A1 * | 9/2006 | Rahn | A47J 31/106 99/279 |
| 2006/0286290 | A1 * | 12/2006 | Wanthal | B05B 7/0025 427/8 |
| 2007/0107604 | A1 * | 5/2007 | Wei | A47J 31/461 99/279 |
| 2007/0289453 | A1 * | 12/2007 | Halliday | B65D 85/8043 99/295 |
| 2008/0226777 | A1 * | 9/2008 | Helfend | C12G 3/06 426/134 |
| 2009/0120299 | A1 * | 5/2009 | Rahn | A47J 31/469 99/279 |

(56) References Cited

U.S. PATENT DOCUMENTS

| | | | |
|---|---|---|---|
| 2010/0028495 A1* | 2/2010 | Novak | B65D 85/8043 426/77 |
| 2010/0107887 A1* | 5/2010 | Bentley | A47J 31/44 99/288 |
| 2010/0163567 A1* | 7/2010 | Chiang | A47G 23/16 220/703 |
| 2010/0291282 A1* | 11/2010 | Yamakawa | C12G 3/06 426/592 |
| 2011/0030732 A1* | 2/2011 | Boussemart | A47J 31/60 134/18 |
| 2011/0061542 A1* | 3/2011 | Jimenez | A47J 31/44 99/300 |
| 2011/0117259 A1* | 5/2011 | Storek | A47J 36/14 426/509 |
| 2011/0192423 A1* | 8/2011 | Boussemart | A47J 31/60 134/18 |
| 2011/0223308 A1* | 9/2011 | Motzaeli | C12G 3/005 426/575 |
| 2011/0262601 A1* | 10/2011 | Manser | A23L 33/40 426/231 |
| 2012/0024160 A1* | 2/2012 | Van Os | A47J 42/50 99/280 |
| 2012/0035761 A1* | 2/2012 | Tilton | G07F 13/065 700/233 |
| 2012/0137894 A1* | 6/2012 | Goeltenboth | A47J 31/44 99/285 |
| 2012/0148707 A1* | 6/2012 | Lackey | A23L 2/56 426/66 |
| 2013/0068109 A1* | 3/2013 | Pribus | A47J 31/407 99/295 |
| 2013/0071532 A1* | 3/2013 | Pribus | A47J 31/407 426/431 |
| 2013/0129888 A1* | 5/2013 | Kornacki | C12H 1/16 426/487 |
| 2013/0189400 A1* | 7/2013 | Pribus | A47J 31/407 426/115 |
| 2013/0189405 A1* | 7/2013 | Filliol | A47J 31/525 426/231 |
| 2013/0216673 A1* | 8/2013 | Storek | A47J 27/62 426/509 |
| 2013/0247769 A1* | 9/2013 | Agon | A47J 31/52 99/279 |
| 2013/0247771 A1* | 9/2013 | Maisch | A47J 31/4407 99/283 |
| 2013/0340629 A1* | 12/2013 | Jetton | A23G 3/0257 99/356 |
| 2014/0000657 A1* | 1/2014 | Boussemart | A47J 31/60 134/18 |
| 2014/0072678 A1* | 3/2014 | Jenkins | A47J 31/00 426/115 |
| 2014/0102316 A1* | 4/2014 | Buzick | A47J 37/0688 99/331 |
| 2014/0109770 A1* | 4/2014 | Kolar | A23G 9/30 99/275 |
| 2014/0150665 A1* | 6/2014 | Pearson | B67D 1/0029 99/295 |
| 2014/0150669 A1* | 6/2014 | Green | B67D 1/0058 99/323.2 |
| 2014/0150670 A1* | 6/2014 | Green | B67D 1/0058 99/323.2 |
| 2014/0154391 A1* | 6/2014 | Mehta | A23L 2/54 426/590 |
| 2014/0272019 A1* | 9/2014 | Schuh | A47J 43/27 426/115 |
| 2014/0335232 A1* | 11/2014 | Beth Halachmi | A23G 9/045 426/87 |
| 2014/0335242 A1* | 11/2014 | Huang | C12G 3/04 426/231 |
| 2014/0338541 A1* | 11/2014 | Jaccard | A47J 31/468 99/283 |
| 2014/0377428 A1* | 12/2014 | Bhalerao | A47J 31/401 426/433 |
| 2015/0250223 A1* | 9/2015 | Kaneko | C12G 3/06 426/312 |
| 2016/0368753 A1* | 12/2016 | Bethuy | B67D 1/0025 |

FOREIGN PATENT DOCUMENTS

| | | |
|---|---|---|
| RU | 2123042 | 12/1998 |
| WO | 9637120 | 11/1996 |

\* cited by examiner

INFUSER FOR ALCOHOLIC BEVERAGES

CROSS-REFERENCE TO RELATED APPLICATION

This application is the U.S. national phase of PCT Application No. PCT/ES2016/070090 filed on Feb. 16, 2016, which claims priority to ES Patent Application No. P201530209 filed on Feb. 16, 2015, the disclosures of which are incorporated in their entirety by reference herein.

OBJECT OF THE INVENTION

The object of the present invention application is to register an infuser for alcoholic beverages which incorporates notable innovations and advantages with respect to the techniques used hitherto.

More specifically, the invention proposes the development of an infuser for alcoholic beverages which, due to the particular arrangement thereof, allow alcoholic beverages with variable graduation to be obtained, suitable for human consumption, automatically mixing ethyl alcohol diluted with a food essence.

BACKGROUND OF THE INVENTION

Fermented cereals, the juice of fruits and honey are known in the current state of the art, which have been used for thousands of years to produce alcohol (ethyl alcohol or ethanol).

Fermented beverages have existed since the dawn of Egyptian civilization and there is evidence of a primitive alcoholic beverage in China around the year 7000 BC. In India, an alcoholic beverage called sure, distilled from rice, was used between the years 3000 and 2000 BC.

Alcoholic beverages are beverages which contain ethanol (ethyl alcohol) in the composition thereof. In terms of the preparation, a distinction can be made between the beverages produced simply by alcoholic fermentation (wine, beer, cider, mead, sake) in which the alcohol content does not always exceed 15 degrees of alcohol and those produced by distillation, generally from a previous fermentation product. The latter are called liquors and include beverages with very varied characteristics, beverages such as cognac, whiskey, spirits, anises, vermouth, amongst others.

The quantity of alcohol content in an alcoholic beverage is determined by the volume thereof (ml of alcohol) or by the graduation thereof (degrees).

There are essences on the market suitable for human consumption with flavors of the beverages previously mentioned and which can be infused with ethyl alcohol diluted in water. It is therefore desirable to be able to prepare these alcoholic infusions with comfort and safety without running risks of ethylic intoxication.

The present invention helps to solve and address the present problem, since it allows alcoholic beverages with variable graduation to be obtained, suitable for human consumption, automatically mixing ethyl alcohol diluted with a food essence.

DESCRIPTION OF THE INVENTION

The present invention has been developed with the aim of providing an infuser for alcoholic beverages which comprises an ethyl alcohol and a water source which are hydraulically connected with a volumetric mixing chamber, a capsule holder downstream of the volumetric chamber for placement of monodose capsules of essences and injection and extraction means of the liquid from the volumetric chamber inside the capsule, characterized by the fact that the connection of the ethyl alcohol tank and the water source with the volumetric chamber is implemented by way of shut-off solenoid valves and the volumetric chamber comprising, in the interior thereof, a main electrode and a plurality of secondary electrodes arranged above the first main electrode at different levels.

Preferably, in the infuser for alcoholic beverages, the shut-off solenoid valves are individual.

Alternatively, in the infuser for alcoholic beverages, the shut-off solenoid valves are in a single block.

Alternatively, in the infuser for alcoholic beverages, the shut-off solenoid valves are non-return valves hydraulically connected with the volumetric chamber.

Preferably, in the infuser for alcoholic beverages, the injection and extraction means comprise a pump with any type of drive and with electric actuation, hydraulically connected with the volumetric chamber and a plurality of injection and extraction needles hydraulically connected with the volumetric chamber.

Preferably, in the infuser for alcoholic beverages, the pump is a peristaltic pump.

Preferably, in the infuser for alcoholic beverages, the water source comprises at least one water tank or an outlet for the supply of water from the public drinking water system.

Alternatively, in the infuser for alcoholic beverages, the ethyl alcohol tank and/or the water tank incorporate automatic shut-off valves.

Additionally, in the infuser for alcoholic beverages, the ethyl alcohol tank and/or the water tank incorporate level sensors.

Additionally, in the infuser for alcoholic beverages, the capsule holder comprises an indicator of the presence or absence of capsules.

Preferably, the infuser for alcoholic beverages comprises a locking means.

Additionally, in the infuser for alcoholic beverages, the locking means is electronic.

Alternatively, in the infuser for alcoholic beverages, the volumetric chamber is connected to at least one flowmeter or any flow measuring device.

Preferably, the infuser for alcoholic beverages incorporates an electronic control unit.

Preferably, the infuser for alcoholic beverages incorporates a communication interface for the user to communicate with the control unit.

Preferably, in the infuser for alcoholic beverages, the interface comprises a touch screen or wireless means.

Additionally, the infuser for alcoholic beverages incorporates an internal or external power source.

Additionally, the infuser for alcoholic beverages incorporates a single-use or rechargeable battery.

Owing to the present invention, alcoholic beverages with variable graduation suitable for human consumption are obtained, automatically mixing ethyl alcohol diluted with a food essence.

Other characteristics and advantages of the infuser for alcoholic beverages will be evident from the description of a preferred, but not exclusive, embodiment, which is illustrated by way of non-limiting example in the drawings, which are included, in which:

DESCRIPTION OF A PREFERRED EMBODIMENT

Figure 1:
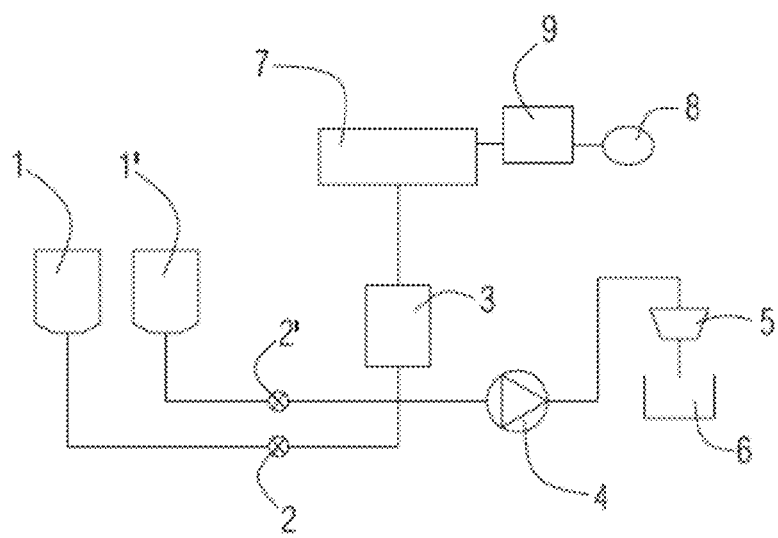
FIG. 1—is a schematic view of a preferred embodiment of the infuser for alcoholic beverages of the present invention.

As is schematically depicted in FIG. 1, the infuser for alcoholic beverages of the present invention comprises an ethyl alcohol tank 1 and a water source which are hydraulically connected with a volumetric mixing chamber 3, a capsule holder 5 downstream of the volumetric chamber 3 for placement of monodose capsules of essences and injection and extraction means of the liquid from the volumetric chamber 3 inside the capsule.

In this preferred embodiment, the water source comprises a water tank 1'. Various water tanks may be arranged, where appropriate, if it is desired to be able to apply different types of water.

In other preferred embodiments not depicted in the drawings, the water source can be an outlet for the supply of water from the public drinking water system.

The connection of the ethyl alcohol tank 1 and the water tank 1' with the volumetric chamber 3 is implemented by way of shut-off solenoid valves 2, 2'.

Figure 2:
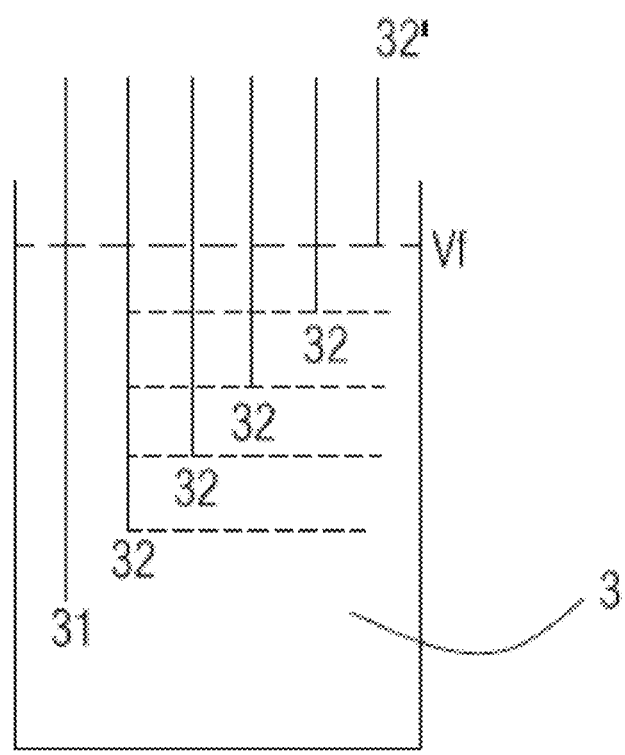
FIG. 2—is a schematic view of the volumetric chamber of a preferred embodiment of the infuser for alcoholic beverages of the present invention.

The volumetric chamber 3 comprises, in the interior thereof, a main electrode 31 and a plurality of secondary electrodes 32 arranged above the first main electrode 31 at different levels (indicated by the dashed lines) as is schematically observed in FIG. 2.

In other variants not depicted in the drawings, the water tank 1' can be substituted by a pump and a connection which allows liquid to be pumped from a bottle or auxiliary tank. The infusions can thus be prepared with other elements (tonic, sparkling water . . . ). Whereas, improved cleaning means would be required to avoid sugar deposits or other substances.

In this preferred embodiment, the shut-off solenoid valves 2, 2' are individual. In other preferred embodiments, the shut-off solenoid valves 2, 2' can be in a single block or be non-return valves hydraulically connected with the volumetric chamber 3.

Preferably, in the infuser for alcoholic beverages, the injection and extraction means of the liquid from the volumetric chamber 3 inside the capsule comprise a pump 4 which, in this preferred embodiment is peristaltic and electrically actuated, hydraulically connected with the volumetric chamber 3 and a plurality of injection and extraction needles (not depicted in the drawings) for the capsules, hydraulically connected with the volumetric chamber 3.

The infuser for alcoholic beverages of the invention incorporates an electronic control unit 7, with the capacity to regulate the solenoid valves 2, 2' and the pump 4. It also incorporates a communication interface 9 for the user to communicate with the control unit 7 which can comprise a touch screen or wireless means 8.

The alcohol and the water are respectively transferred to the volumetric chamber 3 from the alcohol tank 1 and the water tank 1' by means of the solenoid valves 2, 2' and the pump 4 which is filled to a final established volume Vf.

During the operation of the infuser for alcoholic beverages of the invention, a minimum determined volume of alcohol of the alcohol tank 1 is assumed which can be diluted with water from the water tank 1' until the final volume Vf is reached with the desired graduation in the volumetric chamber 3. The control unit 7 is responsible for calculating how much alcohol and how much water should be taken from each tank 1, 1' respectively and accordingly the same control unit 7 regulates the solenoid valves 2, 2'.

When the final volume Vf is obtained in the volumetric chamber 3, the mixture is extracted from the volumetric chamber 3 by means of the pump 4 to the capsule holder 5, where it is infused in a monodose capsule which contains a food essence, from which the content is extracted to the final receptacle 6.

As has already been cited, the infuser for alcoholic beverages of the invention incorporates a control unit 7 with the capacity to regulate the solenoid valves 2, 2' and the pump 4 which also calculates the quantities of alcohol and water to be extracted as a function of the information introduced by the user themselves into the interface.

Determining the required volumes of water and diluted alcohol can be controlled by means of a volumetric chamber 3 schematically depicted in FIG. 2 which has a main electrode 31 and a series of secondary electrodes 32 at different levels depicted by lines in FIG. 2 and above the main electrode 31.

The secondary electrodes 32 are arranged vertically and separate downwards from the same level. Each secondary electrode 32 reaches a depth of interest inside the volumetric chamber 3.

The alcohol volume is determined by a secondary electrode 32 selected by the control unit 7 which has an electric connection by way of the liquid with the main electrode 31. The volumetric chamber 3 is filled from the bottom up, as the level of liquid rises. When the diluted alcohol reaches the selected secondary electrode 32, the filling of alcohol is interrupted by means of the solenoid valves 2, 2' and the filling with water begins until the final secondary electrode 32' is reached which marks the final volume Vf.

As the level of water rises, the different secondary electrodes 32 are also placed into contact with the main electrode 31 (the deepest one). Information is thus obtained of the different levels which the water reaches during the rise thereof in the volumetric chamber 3.

The arrangement of the principal 31 and secondary 32 electrodes allows a beverage to be obtained with as many different graduations as numbers of secondary electrodes 32 installed. For example, from a minimum of 20% to the maximum of 40%.

In other preferred embodiments, the volumetric chamber 3 can be connected to a flowmeter or any flow measuring device.

In the case of the flowmeter, this is a device which generates a determined number of pulses (counts) as a function of the quantity of milliliters of liquid which pass through a tube in one second, for example a lap counter of a vane, the rotation speed of which is a function of the speed of the liquid which passes by.

Using said flowmeter, as it is also connected to the control unit 7, and by means of software, these pulses are converted into milliliters per second to determine the volume of the liquid served.

The capsule holder 5 incorporates an indicator, which communicates the presence or absence of capsules to the control unit 7, thus avoiding incorrect operation.

The monodose capsule located in the capsule holder 5 can have a frangible wall (for example made of aluminum foil) which is passed through by one or more injection or extraction needles of the liquid (not depicted in the drawings). Preferably, the extraction needle will not perforate the capsule until consumer gives the command, whether using a button or using a lever actuatable by the glass or final receptacle.

As a security measure, the infuser for alcoholic beverages of the invention will have a locking mode, for example with a password in order to avoid an unauthorized person (a minor, for example) accessing the preparation of beverages or the alcohol tank 1. To this end, the infuser for alcoholic beverages of the invention comprises a locking means, for example an electronic locking means.

The alcohol tank 1 and the water tank 1' of the preferred embodiment have automatic shut-off valves, actuated by springs which only allow the passage of liquid when they are placed in the operative position and they close by themselves when the alcohol tank 1 and the water tank 1' are disassembled for the cleaning or maintenance thereof. Similarly, they have level sensors to warn of the absence of sufficient alcohol or water. An example of level sensors would be infrared means which utilize the refraction of the beam to know whether or not there is liquid at the desired level.

In order to reduce the required functions of the pump 4 or even dispense with it, the volumetric chamber 3 can be installed at a level above the capsule holder 5.

In order to ensure the operation thereof, the infuser for alcoholic beverages of the present invention incorporates an internal or external power source or alternatively a single-use or rechargeable battery.

Owing to the infuser for alcoholic beverages of the present invention, the industrial method for producing distilled alcoholic beverages such as gins, vodka, etc., may be reproduced and this possibility provided at both a domestic level and in the HORECA sector, that is to say, to instantly produce the alcoholic beverage which the client wants to consume, with the benefits of having produced it "instantly", taking into account that the ethanol (alcoholic base of these beverages), however well packaged it is, may lose certain properties.

Figure 3:
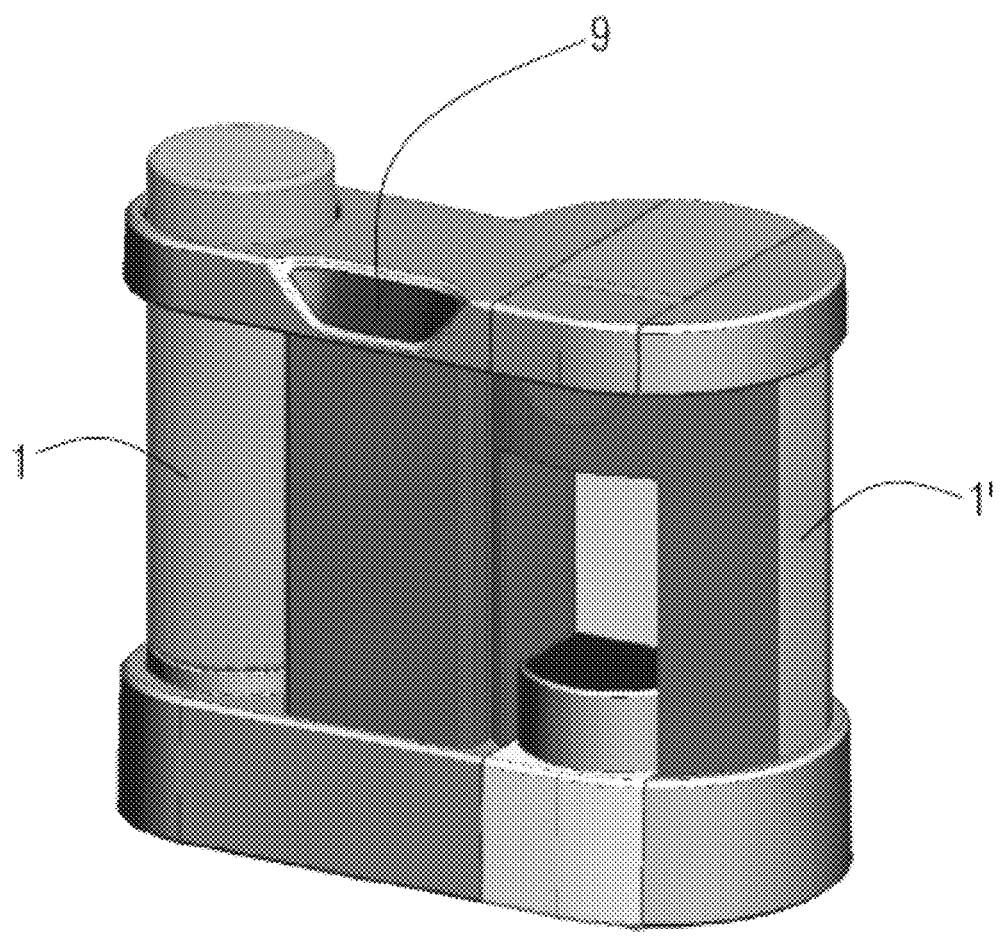
FIG. 3—is a schematic and perspective view of a preferred embodiment of the infuser for alcoholic beverages of the present invention, implemented for the operation and service thereof in the manner of a small domestic appliance such as for example a coffee maker.

Therefore the infuser for alcoholic beverages of the present invention allows the industrial production phase of these types of alcoholic beverages to be reproduced in a domestic or HORECA device with reduced dimensions and easy use, similar to a small domestic appliance such as for example a coffee maker, amongst others, as is schematically depicted in FIG. 3, wherein the visible elements of the infuser for alcoholic beverages of the present invention are indicated.

The details, the forms, the dimensions and the other accessory elements as well as the materials used in the manufacture of the infuser for alcoholic beverages of the invention may be conveniently substituted by others which are technically equivalent and do not depart from the essentiality of the invention nor from the scope defined by the claims which are included below.

The invention claimed is:

1. An infuser for variable graduation alcoholic beverages, the infuser comprising:
   an ethyl alcohol tank and at least one water tank which are hydraulically connected with a volumetric mixing chamber,
   a capsule holder downstream of the volumetric mixing chamber for placement of monodose capsules of essences,
   a pump enabling injection and extraction of the liquid from the volumetric mixing chamber inside the capsule,
   an electronic control unit with the capacity to regulate said solenoid valves and the pump,
   a communication interface which allows communication between a user and electronic control unit, shut-off solenoid valves connected with the volumetric chamber controlling the connection of the ethyl alcohol tank and the water source with the volumetric chamber, and
   level sensors located in the ethyl alcohol tank and the water tank,
   wherein said electronic control unit, as a function of the information introduced by a user into said communication interface controls the shut-off solenoid valves connected with the volumetric chamber controlling the connection of the ethyl alcohol tank and the water source, regulates the quantities of alcohol and water to be extracted from each tank and delivered to the volumetric chamber.

2. The infuser according to claim 1, wherein the pump is peristaltic.

3. The infuser for alcoholic beverages according to claim 1, wherein the ethyl alcohol tank, the water tank or both the ethyl alcohol tank and the water tank incorporate automatic shut-off valves.

4. The infuser according to claim 1, wherein the level sensors are an infrared type.

5. The infuser according to claim 1, wherein the volumetric chamber comprises, in the interior thereof, a main electrode and a plurality of secondary electrodes arranged above the main electrode at different levels.

6. The infuser according to claim 1, wherein the volumetric chamber is connected to at least one flowmeter.

7. The infuser according to claim 1, wherein the volumetric chamber is installed at a level above capsule holder.

* * * * *